(12) United States Patent
Esumi (10) Patent No.: US 11,374,526 B2
(45) Date of Patent: Jun. 28, 2022

(54) MOTOR CONTROL CIRCUIT

(71) Applicant: Rohm Co., Ltd., Kyoto (JP)

(72) Inventor: Takashi Esumi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 17/239,887

(22) Filed: Apr. 26, 2021

(65) Prior Publication Data

US 2021/0336577 A1   Oct. 28, 2021

(30) Foreign Application Priority Data

Apr. 28, 2020  (JP) .............................. JP2020-079480

(51) Int. Cl.
| | |
|---|---|
| *H02P 1/30* | (2006.01) |
| *H02P 1/52* | (2006.01) |
| *H02P 3/00* | (2006.01) |
| *H02P 27/12* | (2006.01) |
| *H02P 21/22* | (2016.01) |

(52) U.S. Cl.
CPC .............. *H02P 27/12* (2013.01); *H02P 21/22* (2016.02)

(58) Field of Classification Search
CPC ................................ H02P 27/12; H02P 21/22
USPC ......................................................... 318/503
See application file for complete search history.

(56) References Cited

U.S. PATENT DOCUMENTS

| | | | |
|---|---|---|---|
| 2017/0328733 A1* | 11/2017 | Gotoh .................. | G01C 21/367 |
| 2019/0131887 A1* | 5/2019 | Mori ....................... | H02M 1/08 |
| 2020/0412277 A1* | 12/2020 | Natsuhara ......... | H02M 7/53875 |

FOREIGN PATENT DOCUMENTS

JP             6129972 B2      5/2017

* cited by examiner

*Primary Examiner* — Erick D Glass
(74) *Attorney, Agent, or Firm* — Fish & Richardson P.C.

(57) ABSTRACT

The present disclosure is related to ensuring a period for detecting a phase current from a DC bus current of an inverter. A motor control circuit of the present disclosure includes: a voltage command generator and a PWM signal generator. The voltage command generator detects a phase current from a DC bus current of an inverter driving an AC motor, and generating three-phase voltage commands. The PWM signal generator generates three-phase PWM signals to the inverter according to a comparison result of the three-phase voltage commands and a triangular wave signal with a predetermined frequency and outputs the three-phase PWM signals to the inverter. The PWM signal generator corrects a maximum or minimum voltage command by synchronizing the maximum or minimum voltage command with an intermediate command in a first period of multiple consecutive PWM periods.

20 Claims, 7 Drawing Sheets

MOTOR CONTROL CIRCUIT

BACKGROUND OF THE INVENTION

Field of the Invention

The invention disclosed by the present disclosure relates to a motor control circuit.

Description of the Prior Art

In conventional motor control circuits, there are situations where a phase current is detected from a direct-current (DC) bus current of an inverter and driving an alternating-current (AC) motor by means of vector control (for example, refer to patent document 1).

PRIOR ART DOCUMENT

Patent Publication

[Patent publication 1] Japan. Patent No. 6129972

SUMMARY

Problems to be Solved by the Disclosure

However, in conventional motor control circuits, there remains room for further discussion in respect of ensuring a current detection period.

The invention disclosed by the present disclosure is completed in view of the issues discovered by the applicant of the present application, in an objective of providing a motor control circuit capable of ensuring a current detection period.

Technical Means for Solving the Problem

To achieve the objective above, a motor control circuit disclosed by the present disclosure is configured as below (first configuration). For example, the motor control circuit includes a voltage command generator and a pulse-width modulation (PWM) signal generator. The voltage command generator detects a phase current from a direct-current (DC) bus current of an inverter of an alternating-current (AC) motor and generates three-phase voltage commands. The PWM signal generator generates three-phase PWM signals to the inverter according to a comparison result of the three-phase voltage commands and a triangular wave signal with a predetermined frequency and outputs the three-phase PWM signals to the inverter. The PWM signal generator corrects a maximum or minimum voltage command by means of synchronizing the maximum or minimum voltage command with an intermediate voltage command in a first period of a plurality of consecutive PWM periods. The PWM signal generator renders a difference between the maximum or minimum voltage command and the intermediate voltage command to be greater than a predetermined value in a second period. The PWM signal generator sets a total correction amount of an entire interval of the plurality of PWM periods to be zero.

Moreover, the motor control circuit including the first configuration may also be configured as below (second configuration): the PWM signal generator corrects the maximum or minimum voltage command by means of shifting the PWM signal in a first direction in one of the second period consecutively before or after the first period, and shifting the PWM signal in a second direction opposite to the first direction in the other period.

Moreover, the motor control circuit including the first or second configuration may also be configured as below (third configuration): the PWM signal generator corrects the maximum or minimum voltage command by rendering the difference between the maximum or minimum voltage command and the intermediate voltage command to be greater than the predetermined value in one of a first half and a second half of the second period, and rendering a total correction amount of the second period to be substantially zero in the other half.

Moreover, the motor control circuit including any one of the first to third configurations may also be configured as below (fourth configuration): the PWM signal generator allows inversion of the maximum or minimum voltage command and the intermediate voltage command based on connection.

Moreover, the motor control circuit including any one of the first to third configurations may also be configured as below (fifth configuration): the PWM signal generator does not allow inversion of the maximum or minimum voltage command and the intermediate voltage command based on connection.

Moreover, the motor control circuit including any one of the first to fifth configurations may also be configured as below (sixth configuration): the PWM signal generator does not correct the maximum or minimum voltage command when the difference between the maximum or minimum voltage command and the intermediate voltage command is equal to or greater than the predetermined value.

Moreover, the motor control circuit including any one of the first to sixth configurations may also be configured as below (seventh configuration): the voltage command generator generates the three-phase voltage commands by means of vector control.

Moreover, the motor control circuit including the seventh configuration may also be configured as below (eighth configuration): the voltage command generator includes: an analog-to-digital converter (ADC), converting the analog DC bus current into a digital first current value from a current detection timing indicated by the PWM signal generator; a Clarke converter, converting the first current value of three phases into a two-phase second current value; a Park converter, converting the second current value in fixed coordinate system into a third current value in rotating coordinate system; a proportional integral (PI) controller, deriving a first voltage value for correcting the third current value to a target value; an inverse Park converter, converting the first voltage value in rotating coordinate system into a second voltage value in fixed coordinate system; and an inverse Clarke converter, converting the two-phase second current value into the three-phase voltage commands.

Moreover, a motor device disclosed by the present disclosure is configured as below (ninth configuration), that is, including the motor control circuit in any one of the first to eighth configurations, an inverter connected to the motor control circuit, and an AC motor connected to the inverter.

Moreover, the motor device including the ninth configuration may also be configured as below (tenth configuration): the inverter includes a single shunt resistor detecting the DC bus current.

Effects of the Invention

The invention disclosed by the present disclosure provides a motor control circuit capable of ensuring a current detection period.

DETAILED DESCRIPTION OF THE EMBODIMENTS

<Motor Device>

Figure 1:
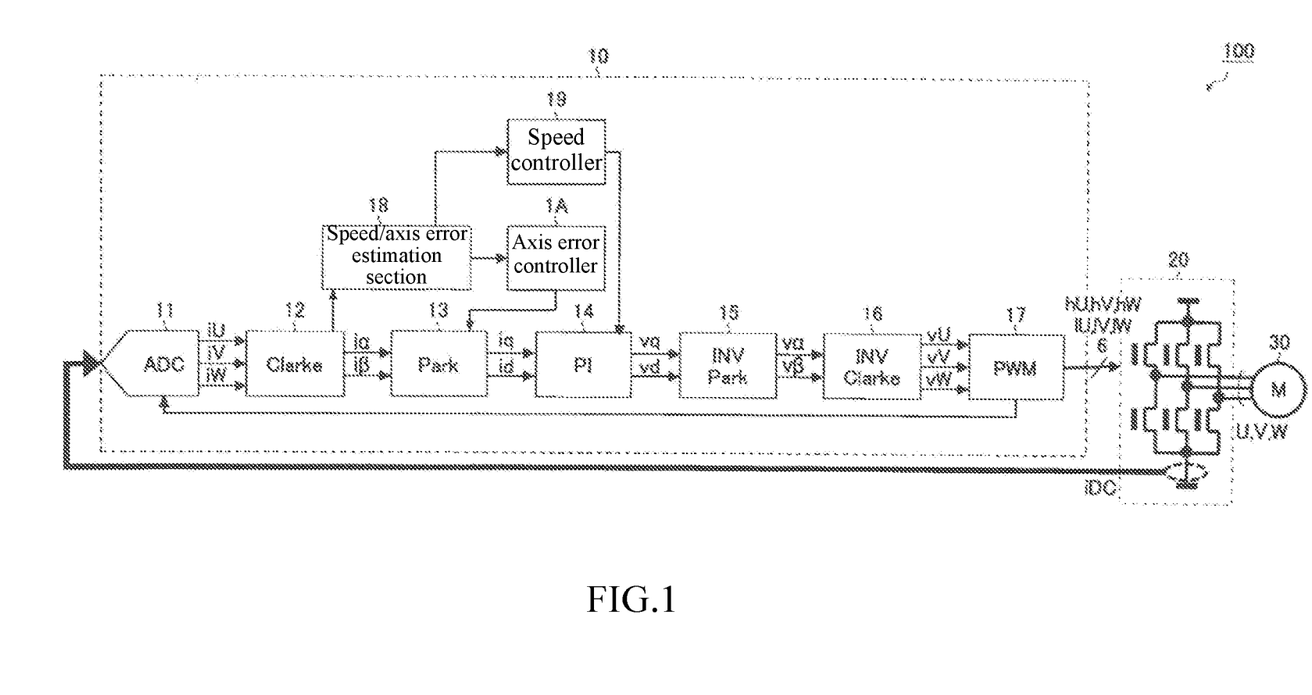
FIG. 1 is a diagram of an overall configuration of a motor device.

FIG. 1 shows a diagram of an overall configuration of a motor device. A motor device 100 of this configuration example includes a motor control circuit 10, an inverter 20 (e.g., a three-phase motor driver integrated circuit (IC)), and an alternating-current (AC) motor 30 (e.g., a three-phase AC motor).

The motor control circuit 10 detects three-phase phase currents iU, iV and iW from a direct-current (DC) bus current iDC of the inverter 20, and drives the AC motor 30 by means of vector control. According to the means of vector control, rotation of the AC motor 30 can be efficiently and smoothly controlled from a low-speed domain to a high-speed domain.

The inverter 20 includes three-phase half-bridges (=three-phase upper-side field-effect transistors (FETs) and lower-side FETs) connected to the motor control circuit 10, and generates, based on three-phase PWM signals (=equivalent to upper-side PWM signals hU, hV and hW applied to the respective gates of the three-phase upper-side FETs, and lower-side PWM signals 1U, 1V and 1W applied to the respective gates of the three-phase lower-side FETs), three-phase driving currents U, V and W (=three-phase sine wave currents having respective phases differing by 120 degrees from one another) flowing toward the motor 30.

Further, although not shown in the drawings, the inverter 20 may include one single shunt resistor as a mechanism that detects the DC bus current iDC. The shunt resistor may be connected between respective common terminals of the three-phase lower-side FETs and the ground terminal, or may be connected between the respective common terminals of the three-phase upper-side FETs and a power terminal.

The AC motor 30 includes three-phase motor coils connected to the inverter 20, and a rotor is rotated by the driving currents U, V and W flowing through the individual motor coils. Further, the rotational speed of the rotor decreases as the frequencies of the driving currents U, V and W get lower, and the rotational speed of the rotor increases as the frequencies of the driving currents U, V and W get higher.

<Motor Control Circuit>

Next, the configuration and operation of the motor control circuit 10 are described with reference to FIG. 1. The motor control circuit 10 of this configuration example includes an analog-to-digital converter (ADC) 11, a Clarke converter 12, a Park converter 13, a proportional integral (PI) controller 14, an inverse Park converter 15, an inverse Clarke converter 16, a PWM signal generator 17, a speed/axis error estimation section 18, a speed controller 19 and an axis error controller 1A.

The ADC 11 samples and converts a DC bus current iDC in analog from a current detection timing indicated by the PWM signal generator 17 to first digital current values iU, iV and iW (=equivalent to three-phase phase currents).

The Clarke converter 12 converts the three-phase first current values iU and iV and iW (wherein iU+iV+iW=0) to two-phase second current values $i\alpha$ ($=iU$) and $i\beta$ ($=(iU+2\times iV)/\sqrt{3}$).

The Park converter 13 converts the second current values $i\alpha$ and $i\beta$ of a fixed coordinate system to third current values id ($=i\alpha \cos\theta + i\beta \sin\theta$) and iq ($=-i\alpha \sin\theta + i\beta \cos\theta$, where $\theta$ is the rotation angle of the rotor) in a rotating coordinate system.

The PI controller 14 derives, by implementing proportional and integral control in parallel, first voltage values vd and vq for correcting the third current values id and iq to expected target current values idref and iqref.

The inverse Park converter 15 converts the first voltage values vd and vq of the rotating coordinate system to second voltage values $v\alpha$ ($=vd\cos\theta - vq\sin\theta$) and $v\beta$ ($=vd\sin\theta + vq\cos\theta$, where $\theta$ is the rotation angle of the rotor) of the fixed coordinate system.

The inverse Clarke converter 16 converts the two-phase second voltage values $v\alpha$ and $v\beta$ to three-phase voltage commands vU ($=v\beta$), vV ($=(-v\beta+\sqrt{3}v\alpha)/2$) and vW ($=(-v\beta-\sqrt{3}v\alpha)/2$).

Moreover, the ADC 11, the Clarke converter 12, the Park converter 13, the PI controller 14, the inverse Park converter 15 and the inverse Clarke converter 16 form a voltage command generator. The voltage command generator detects the phase currents iU, iV and iW from the DC bus current iDC of the inverter 20, and generates the three-phase voltage commands vU, vV and vW by means of vector control. The voltage command generator may be implemented by hardware or may be implemented by software.

The PWM signal generator 17 compares the three-phase voltage commands vV, VV and vW with a triangular wave signal TRI with a predetermined frequency f ($=1/T$), and generates and outputs the three-phase PWM signals (=the upper-side PWM signals hU, hV and hW and the lower-side PWM signals 1U, 1V and 1W) to the inverter 20 according to the comparison result thereof. The upper-side PWM signals hU, hV and hW and the lower-side PWM signals 1U, 1V and 1W are basically signals with mutually inverted levels.

Moreover, the PWM signal generator 17 determines the respective duties of the three-phase PWM signals (hU, hV and hW and 1U, 1V and 1W) according to the three-phase voltage commands vU, vV and vW, generates a gate driving mode of the inverter 20 (the upper-side FETs and the lower-side FETs), and provides an indication for a current detection timing to the ADC 11.

Moreover, the PWM signal generator 17 performs a pulse shift process of the PWM signals in order to ensure the current detection period of the DC bus current iDC (hence the three-phase phase currents iU, iV and iW). More specifically, before comparing the three-phase voltage commands vU, vV and vW with the triangular wave signal TRI, the PWM signal generator 17 performs a correction process on at least one of the three-phase voltage commands vU, vV and vW (=equivalent to duty addition and subtraction of the PWM signals). Details of the pulse shift process (whether correcting the voltage commands is required or the setting of the correction amount) are to be described shortly.

The speed/axis error estimation section 18 estimates a rotational speed and axis error of the three-phase motor 30 according to an output of the Clarke converter 12 (=the second current values iα and iβ).

The speed controller 19 sets the target current values idref and iqref of the PI controller 14 by means of synchronizing the rotational speed of the motor 30 and the expected target value.

The axis error controller 1A sets an estimated position value θc (equivalent to the rotation angle θ of the rotor) for the Park converter 13 by means of reducing the axis error of the three-phase motor 30.

Moreover, the speed/axis error estimation section 18, the speed controller 19 and the axis error controller 1A may be implemented by hardware, or may be implemented by software by means of an appropriate operation process executed by a central processing unit (CPU).

<Phase Current Detection Process>

Figure 2:
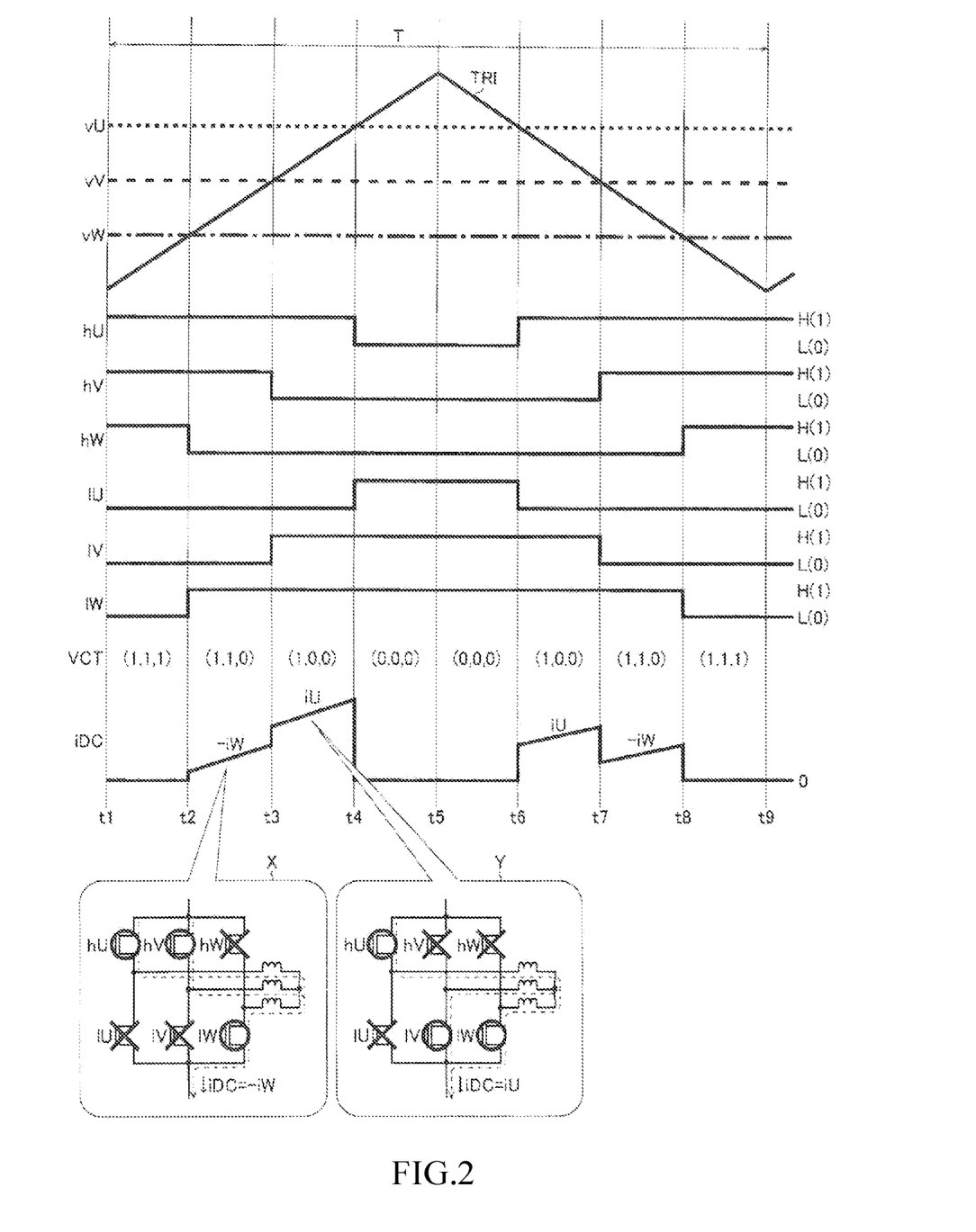
FIG. 2 is a diagram of an example of a phase current detection process.

FIG. 2 shows a diagram of an example of a phase current detection process. From top to bottom, the voltage commands vU, vV and vW (a dotted line, a dashed line and a dashdotted line), the triangular wave signal TRI (a solid line), the upper-side PWM signals hU, hV and hW, the lower-side PWM signals 1U, 1V and 1W, voltage vectors VCT (hU, hV and hW) and the DC bus current iDC, are sequentially depicted.

Further, in the description below, with regard to the three-phase phase currents iU, iV and iW, a direction from the inverter 20 toward the AC motor 30 is defined as positive (+), and a direction from the AC motor 30 toward the inverter 20 is defined as negative (−).

The triangular wave signal TRI rises at timings t1 to t5, falls at timings t5 to t9, and repeats the same behavior after the timing t9. That is to say, the triangular wave signal TRI uses the timings t1 to t9 as a PWM period T, and repeats behaviors of rising and falling at a predetermined PWM frequency f (=1/T).

At the timings t1 to t2 and the timings t8 to t9, vU>vV>VW>TRI. At this point, hU=hV=hW=H (1) and 1U=1V=1W=L (0). Thus, in the inverter 20, all the three-phase upper-side FETs are tuned on, and all the three-phase lower-side FETs are turned off. As a result, iDC=0 because iU=iV=iW=0. That is to say, VCT (1, 1, 1) is equivalent to a zero vector that none of the phase currents flows.

At the timings t2 to t3 and the timings t7 to t8, vU>vV>TRI>vW. At this point, hU=hV=1W=H (1) and 1U=1V=hW=L (0). Thus, in the inverter 20, the U-phase and V-phase upper-side FETs and the W-phase lower-side FET are turned on, and the U-phase and V-phase lower-side FETs and the W-phase upper-side FET are turned off. As a result, iDC=−iW because a current flows in the path in the box denoted as X. That is to say, the W-phase current −iW can be detected by means of sampling the DC bus current iDC in the vector VCT(1, 1, 0).

At the timings t3 to t4 and the timings t6 to t7, vU>TRI>vV>vW. At this point, hU=1V=1W=H (1) and 1U=hV=hW=L (0). Thus, in the inverter 20, the U-phase upper-side FET and the V-phase and W-phase lower-side FETs are turned on, and the U-phase lower-side FET and the V-phase and W-phase upper-side FETs are turned off. As a result, iDC=−iU because a current flows in the path in the box denoted as X. That is to say, the U-phase phase current iU can be detected by means of sampling the DC bus current iDC in the vector VCT(1, 0, 0).

At the timings t4 to t5 and the timings t5 to t6, TRI>vU>vV>vW. At this point, 1U=1V=1W=H (1) and hU=hV=hW=L (0). Thus, in the inverter 20, all the three-phase upper-side FETs are tuned on, and all the three-phase lower-side FETs are turned off. As a result, iDC=0 because iU=iV=iW=0. That is to say, VCT (0, 0, 0) is equivalent to a zero vector that none of the phase currents flows.

Further, in the drawing, an example that the relation of the respective magnitudes of the voltage command values vU, vV and vW is uniquely (vU>vV>vW) fixed and that the four voltage vectors VCT ((1, 1, 1), (1, 1, 0), (1, 0, 0) and (0, 0, 0)) are set along with the timing change in the triangular wave signal TRI is given; however, according to the magnitude relation of the voltage command values vU, vV and vW, four voltage vectors VCT ((0, 1, 1), (0, 1, 0), (1, 0, 1) and (0, 0, 1)) may be further set, so that there are a total of eight voltage vectors VCT.

As described above, the phase current −iW may be detected at the vector VCT (1, 1, 0) and the phase current iU may be detected at the vector VCT (1, 0, 0). Further, the phase current −iU may be detected at the vector VCT (0, 1, 1) and the phase current iV may be detected at the vector VCT (0, 1, 0). Similarly, the phase current −iV may be detected at the vector VCT (1, 0, 1) and the phase current iVW may be detected at the vector VCT (0, 0, 1).

<Pulse Shift Process (Basic Operations)>

Figure 3:
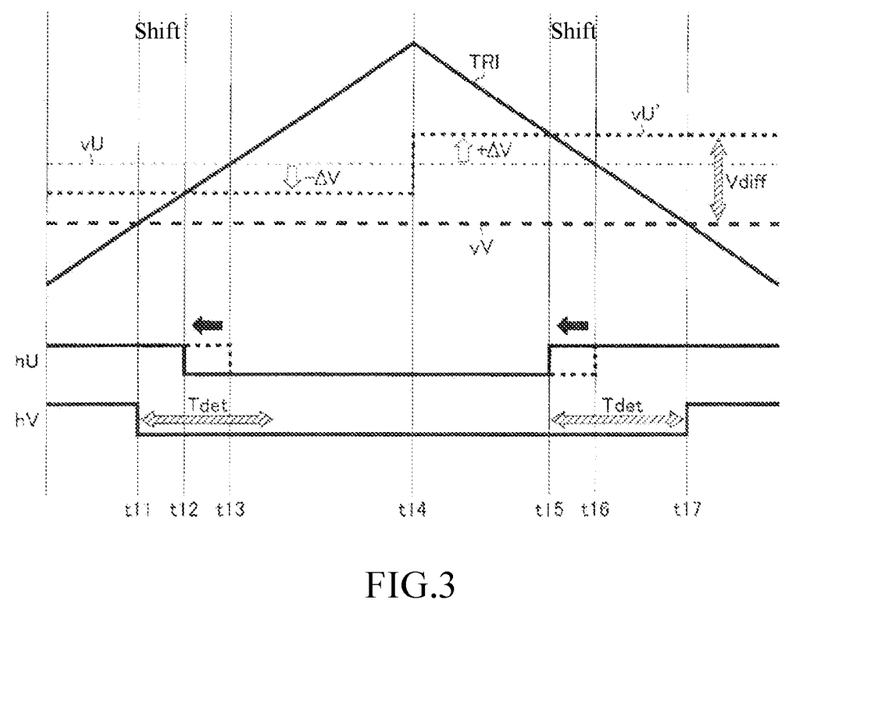
FIG. 3 is a diagram of basic operations of a pulse shift process.

FIG. 3 shows a diagram of an example of a phase current detection process. From top to bottom, the voltage commands vU and vV (a dotted line and a dashed line), the triangular wave signal TRI (a solid line), the upper-side PWM signal hU and the upper-side PWM signal hV, are sequentially depicted. Moreover, in the drawing, it is set that vU>vV (>vW).

Further, with regard to the voltage command vU, the thin dotted line represents a non-corrected command value and the thick dotted line represents a corrected command value (to be referred to as a corrected voltage command vU' below). Further, with regard to the upper-side PWM signal hU, the dotted line represents a non-corrected (without pulse shift) behavior and the solid line represents a corrected (with pulse shift) behavior.

At this point, it is considered to sample the DC bus current iDC in the VCT (1, 0, 0) (that is to say, vU>TRI>vV (>vW)) to detect the U-phase phase current iU.

In the drawing, because a difference (=vU-vV) between the voltage command vU and the voltage command vV is less than a predetermined difference Vdiff, the pulse edges (timings t13 and t16) of the upper-side PWM signal hU are close to the pulse edges (timings t11 and t17) of the upper-side PWM signal hV, and so the needed current detection period Tdet cannot be ensured. Thus, being affected by a ring stream generated by the DC bus current iDC, it is difficult to detect the phase current iU with high accuracy.

Therefore, the PWM signal generator 17 has a function of performing left shift of the upper-side PWM signal hU (=a pulse shift process in a direction that advances the timing at which the pulse edge is generated) by means of correcting the voltage command vU.

By illustrating in accordance with the drawing, a negative correction amount (−ΔV) is assigned to the voltage command vU in the first half (=before the timing t14) of the PWM period T, and a positive correction amount (+ΔV) is assigned to the voltage command vU in the second half of the PWM period T. That is to say, vU'=vU−ΔV in the first half of the PWM period T, and vU'=vU+ΔV in the second half of the PWM period T. Further, the correction amount ΔV of a maximum voltage command max can be set in a manner of satisfying ΔV≥Vdiff−(vU−vV).

According to the correction, in the second half of the PWM period T, because the difference (=vU'−vV) between the corrected voltage command vU' and the voltage command vV becomes equal to or greater than the predetermined difference Vdiff, the pulse edge (the timing t15) of the upper-side PWM signal hU can be pulled close to the pulse edge (the timing t17) of the upper-side PWM signal hV, and so the necessary current detection period Tdet is ensured, further allowing detection of the phase current iU with high accuracy.

Moreover, in the entire period (=the total of the first half and the second half) of the period T, because the total correction amount for the voltage command vU is zero, rotation driving of the AC motor 30 is unlikely resulted.

As such, in order to ensure the current detection period Tdet, the pulse shift process of the PWM signal is extremely effective. Further, various means have been proposed in regard to the pulse shift process of PWM signals.

For example, the means may be: (1) implementing only left shift in the entire period, (2) implementing only right shift in the entire period (=a pulse shift process in a direction of delaying a timing at which a pulse edge is generated), (3) implementing right shift and left shift alternately every one period, (4) implementing right shift, no shift and left shift sequentially every one period, or (5) implementing right shift (1 for the correction amount of 0.5 and 0.5 for the correction period) and left shift (0.5 for the correction amount of 0.5 and 0.5×2 for the correction period) every 1.5 periods.

A novel pulse shift process different from all the means above is brought forth below.

<Pulse Shift Process (First Embodiment)>

Figure 4:
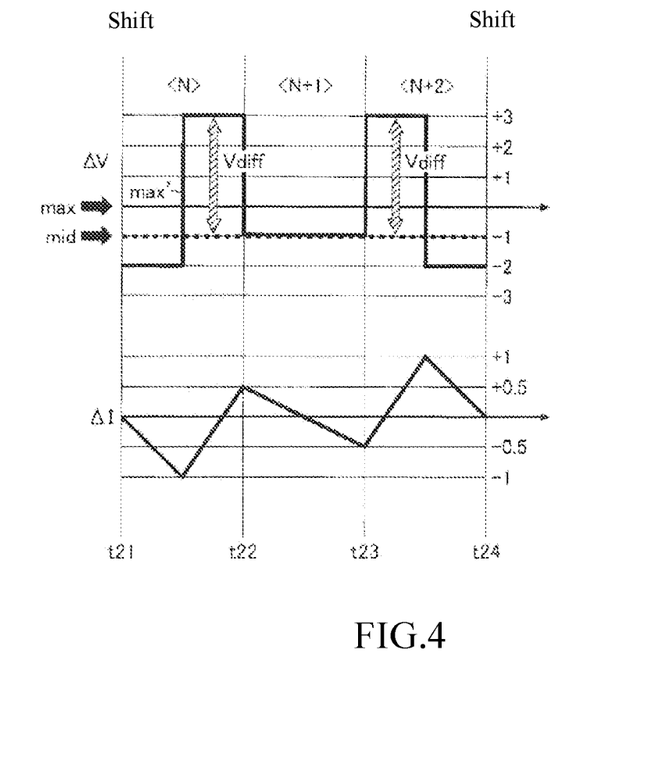
FIG. 4 is a diagram of a pulse shift process according to a first embodiment.

FIG. 4 shows a diagram of a pulse shift process of the PWM signal generator 17 according to the first embodiment. In the upper part of the drawing, a correction amount ΔV of the maximum voltage command max based on a pulse shift process is depicted, and in the lower part of the drawing, a variance ΔI of the DC bus current iDC based on the pulse shift process is depicted.

Further, in the upper part of the drawing, the maximum voltage command max and an intermediate voltage command mid respectively refer to the maximum voltage command and the intermediate voltage command among the existing voltage commands vU, vV and vW. Further, the solid line represents a corrected maximum voltage command max' (=max+ΔV), and the dotted line represents the intermediate voltage command mid.

In the drawing, an example of a situation wherein a difference (=max−mid) between the maximum voltage command max and the intermediate voltage command mid is "1" to ensure that the difference (=Vdiff) needed for the current detection period Tdet is "4" is described.

First of all, in the $N^{th}$ period (=at timings t21 to t22), left shift of the upper-side PWM signal hmax is performed. By illustrating in accordance with the drawing, a negative correction amount (ΔV=−2) is assigned to the maximum voltage command max in the first half of the $N^{th}$ period, and a positive correction amount (ΔV=+3) is assigned to the maximum voltage command max in the second half of the $N^{th}$ period.

That is to say, in the first half of the $N^{th}$ period, max'=max−2. At this point, the variance ΔI of the DC bus current iDC increases in the negative direction (0→−1) according to the correction amount (ΔV=−2) of the maximum voltage command max. On the other hand, in the second half of the $N^{th}$ period, max'=max+3. At this point, the variance ΔI of the DC bus current iDC increases in the positive direction (−1→+0.5) according to the correction amount (ΔV=+3) of the maximum voltage command max.

According to the correction, in the second half of the $N^{th}$ period, since the difference (=max'−mid) between the corrected maximum voltage command max' and the intermediate voltage command mid becomes greater than the predetermined value Vdiff (=4), the needed current detection period Tdet is ensured.

Next, in the $(N+1)^{th}$ period (=at timings t22 to t23), zero-difference shift is performed (=a pulse shift process of synchronizing the respective pulse edges of the upper-side PWM signals hmax and hmid by reducing the maximum voltage command max to the intermediate voltage command mid). By illustrating in accordance with the drawing, a negative correction amount (ΔV=−1) is assigned to the maximum voltage command max throughout the $(N+1)^{th}$ period.

That is to say, in the $(N+1)^{th}$ period, max'=max−1 (=mid). At this point, the variance ΔI of the DC bus current iDC increases in the negative direction (+0.5→−0.5) according to the correction amount (ΔV=−1) of the maximum voltage command max.

Next, in the $(N+2)^{th}$ period (=at timings t23 to t24), right shift of the upper-side PWM signal hmax is performed. By illustrating in accordance with the drawing, a positive correction amount (ΔV=+3) is assigned to the maximum voltage command max in the first half of the $(N+2)^{th}$ period, and a negative correction amount (ΔV=−2) is assigned to the maximum voltage command max in the second half of the $(N+2)^{th}$ period.

That is to say, in the first half of the $(N+2)^{th}$ period, max'=max+3. At this point, the variance ΔI of the DC bus current iDC increases in the positive direction (−0.5→+1) according to the correction amount (ΔV=+3) of the maximum voltage command max. In contrast, in the second half of the $(N+2)^{th}$ period, max'=max−2. At this point, the variance ΔI of the DC bus current iDC increases in the negative direction (+1→0) according to the correction amount (ΔV=−2) of the maximum voltage command max.

According to the correction, in the second half of the $(N+2)^{th}$ period, since the difference (=max'−mid) between the corrected maximum voltage command max' and the intermediate voltage command mid becomes greater than the predetermined value Vdiff (=4), the needed current detection period Tdet is ensured.

As such, the PWM signal generator 17 corrects the maximum voltage command max by the following means, that is, in the $(N+1)^{th}$ period (=equivalent to the first period) of multiple consecutive PWM periods (=the $N^{th}$ to the $(N+2)^{th}$ periods), synchronizing the maximum voltage command max with the intermediate voltage command mid, and in the $N^{th}$ period and the $(N+2)^{th}$ period (=equivalent to the second period), setting the difference between the maximum voltage command max and the intermediate voltage command mid to be greater than the predetermined value Vdiff.

Further, the PWM signal generator 17 corrects the maximum voltage command max by means of rendering the total correction amount ΣΔV in the entire period of the multiple PWM periods (=the $N^{th}$ to the $(N+2)^{th}$ periods) to be zero.

By illustrating in accordance with the drawing, the total correction amount ΣΔV(N) of the $N^{th}$ period is "+1 (=−2+3)", the total correction amount ΣΔV(N+1) of the $(N+1)^{th}$ period is "−2 (=−1−1), and the total correction amount ΣΔV(N+2) of the $(N+2)^{th}$ period is "+1 (=+3-2)". As a result, in the entire period of the $N^{th}$ to $(N+2)^{th}$ periods, the total amount ΣΔV (=ΣΔV(N)+ΣΔV(N+1)+ΣΔV(N+2)) becomes "0 (=+1-2+1)".

According to the pulse shift process above, the total correction amount ΣΔV of the three periods is kept at zero and the needed current detection period Tdet can be ensured.

Moreover, particularly in the $(N+1)^{th}$ period, the chance for current detection in the period is discarded, so that the maximum voltage command max synchronizes with the intermediate voltage command mid. That is to say, in the $(N+1)^{th}$ period in which it is determined current detection is not to be performed. In other words, "it is not necessary to make a difference between the maximum voltage command max and the intermediate voltage command mid". The maximum voltage command max is reduced so that the difference (=max−mid) between the two becomes zero.

As a result, in the $N^{th}$ period and the $(N+2)^{th}$ period, the increment in the voltage command max can be set to be a larger value so as to cancel out the decrement in the maximum voltage command max in the $(N+1)^{th}$ period, thereby ensuring a longer current detection period Tdet.

Further, in the $(N+1)^{th}$ period in which current detection is not performed, it is sufficient to maintain the current detection value obtained in the previous $N^{th}$ period, or the magnitude of the phase current derived from the current detection value up to this point.

Moreover, in the $N^{th}$ to $(N+2)^{th}$ periods, it is necessary to implement the pulse shift process (the left shift, right shift or zero-difference shift) every one period, and there is no PWM period in which the pulse shift process is not performed. Thus, because the frequency of overlapping components of noise accompanying the pulse shift process does not lower to a hearable range of human (20 Hz to 20 kHz in general), generation of noise can be suppressed.

Moreover, the PWM signal generator 17 corrects the maximum voltage command max by the following means, that is, left shifting the upper-side PWM signal hmax in one period of the $N^{th}$ period and the (N+2) period consecutive before and after the $(N+1)^{th}$ period, and right shifting the PWM signal hmax in the other period.

According to the pulse shift process above, the variance ΔI of the DC bus current iDC in the $N^{th}$ to $(N+2)^{th}$ periods changes in a symmetrical manner when observed in the time axis. Thus, the strain of phase current can be moderated, and so rotation driving of the AC motor 30 is unlikely affected.

Moreover, the PWM signal generator 17 corrects the maximum voltage command max by the following means, that is, setting the difference between the maximum voltage command max and the intermediate voltage command mid to be greater than Vdiff in one between the first half and the second half of each of $N^{th}$ period and the $(N+2)^{th}$ period, and setting the respective total correction amounts ΣΔV(N) and ΣΔV(N+2) of the $N^{th}$ period and the $(N+2)^{th}$ period to be approximately zero in the other half.

For example, for the $N^{th}$ period, in order to ensure the current detection period Tdet, the maximum voltage command max is increased in the second half of the $N^{th}$ period, and the maximum voltage command max is correspondingly decreased in the first half of the $N^{th}$ period.

Further, for the $(N+2)^{th}$ period, in order to ensure the current detection period Tdet, the maximum voltage command max is increased in the first half of the $(N+2)^{th}$ period, and the maximum voltage command max is correspondingly decreased in the second half of the $(N+2)^{th}$ period.

According to the pulse shift process above, the variance ΔI of the DC bus current iDC in each of the $N^{th}$ to $(N+2)^{th}$ periods is approximately zero in that period, and so rotation driving of the AC motor 30 is unlikely affected.

Moreover, in the pulse shift process of this embodiment, inversion of the maximum voltage command max (or the minimum voltage command min) generated based on correction and the intermediate voltage command mid is allowed (for example, refer to the first half of the $N^{th}$ period and the second half of the $(N+2)^{th}$ period). In this case, there is a risk of unexpected behaviors of the phase current (reversal of the phase current in a worst case) such that the driving sound of the AC motor 30 may become louder. Thus, a phase shift process that unlikely generates the issue above is brought forth below.

<Pulse Shift Process (Second Embodiment)>

Figure 5:
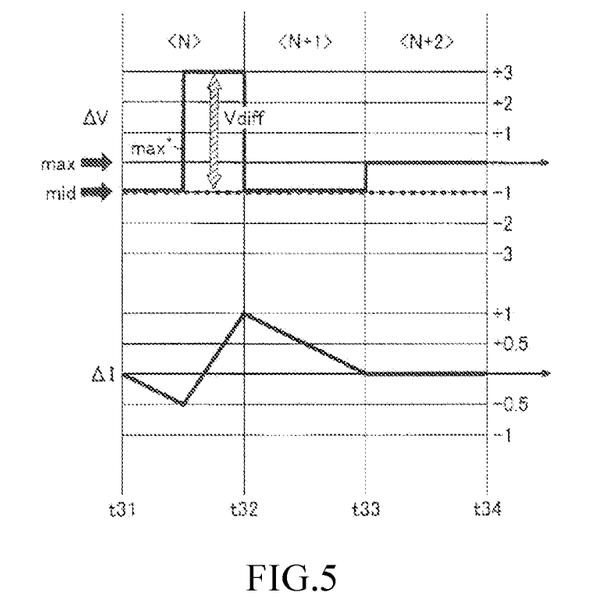
FIG. 5 is a diagram of a pulse shift process according to a second embodiment.

FIG. 5 shows a diagram of a pulse shift process of the PWM signal generator 17 according to the second embodiment. Similar to FIG. 4, in the upper part of the drawing, a correction amount ΔV of the maximum voltage command max based on a pulse shift process is depicted, and in the lower part of the drawing, a variance ΔI of the DC bus current iDC based on the pulse shift process is depicted.

Further, in the drawing, similar to the first embodiment (FIG. 4) described above, an example of a situation wherein a difference (=max−mid) between the maximum voltage command max and the intermediate voltage command mid is "1" to ensure that the difference (=Vdiff) needed for the current detection period Tdet is "4" is described.

However, different from the first embodiment (FIG. 4) described above, the PWM signal generator 17 does not allow inversion of the maximum voltage command max generated based on correction and the intermediate voltage command mid. In other words, the correction amount ΔV of the maximum voltage command max is limited to be ΔV≥−1.

According to the pulse shift process above, since the phase current does not generate unexpected behaviors, the increase in the driving sound of the AC motor 30 can be suppressed.

First of all, in the $N^{th}$ period (=at timings t31 to t32), left shift of the upper-side PWM signal hmax is performed. By illustrating in accordance with the drawing, a negative correction amount (ΔV=−1) is assigned to the maximum voltage command max in the first half of the $N^{th}$ period, and a positive correction amount (ΔV=+3) is assigned to the maximum voltage command max in the second half of the $N^{th}$ period.

That is to say, in the first half of the $N^{th}$ period, max'=max−1 (=mid). At this point, the variance ΔI of the DC bus current iDC increases in the negative direction (0→−0.5) according to the correction amount (ΔV=−1) of the maximum voltage command max. On the other hand, in the second half of the $N^{th}$ period, max'=max+3. At this point, the variance ΔI of the DC bus current iDC increases in the positive direction (−0.5→+1) according to the correction amount (ΔV=+3) of the maximum voltage command max.

According to the correction, in the second half of the $N^{th}$ period, since the difference (=max'−mid) between the corrected maximum voltage command max' and the intermediate voltage command mid becomes greater than the predetermined value Vdiff (=4), the needed current detection period Tdet is ensured. From such perspective, there is no change from the first embodiment (FIG. 4) described above.

Next, in the $(N+1)^{th}$ period (=at timings t32 to t33), zero-difference shift is performed. By illustrating in accordance with the drawing, a negative correction amount ($\Delta V=-1$) is assigned to the maximum voltage command max throughout the $(N+1)^{th}$ period.

That is to say, in the $(N+1)^{th}$ period, max'=max-1 (=mid). At this point, the variance $\Delta I$ of the DC bus current iDC increases in the negative direction (+1→0) according to the correction amount ($\Delta V=-1$) of the maximum voltage command max.

Next, in the $(N+2)^{th}$ period (=at timings t33 to t34), the pulse shift process is skipped (no shifting). At this point, the variance $\Delta V$ of the DC bus current iDC also becomes zero.

Moreover, one reason for skipping the pulse shift process is, in the previous $N^{th}$ period and $(N+1)^{th}$ period, the total correction amount $\Sigma\Delta V(=\Delta V(N)+\Sigma\Delta V(N+1))$ of the two has become zero, and so further correction is not needed in the $(N+2)^{th}$ period. By illustrating in accordance with the drawing, the total correction amount $\Sigma\Delta V(N)$ of the $N^{th}$ period is "+2 (=-1+3)", the total correction amount $\Sigma\Delta V(N+1)$ of the $(N+1)^{th}$ period is "-2 (=-1-1), and so the total correction amount $\Sigma\Delta V(N+2)$ of the two is "0 (=+2-2)". Thus, the pulse shift process is skipped in the $(N+2)^{th}$ period.

Further, another reason for skipping the pulse shift process is, in the $(N+2)^{th}$ period, the total correction amount $\Sigma\Delta V(N+2)$ cannot be set to zero if the difference between the corrected maximum voltage command max and the intermediate voltage command mid is set to be greater than the predetermined value Vdiff. For example, given that the needed correction amount ($\Delta V=+3$) is assigned to the maximum voltage command max in the first half of the $(N+2)^{th}$ period, even if the negative correction amount ($\Delta V=-1$) is assigned at most in the second half of the $(N+2)^{th}$ period, the total correction amount $\Sigma\Delta V(N+2)$ still becomes "+2 (=+3-1)". To prevent the situation above, the pulse shift process is skipped in the $(N+2)^{th}$ period.

As such, in the pulse shift process in which inversion of the maximum voltage command max generated based on correction and the intermediate voltage command mid is not allowed, not only the chance for current detection of the $(N+1)^{th}$ period in which zero-difference shift is lost, but also the chance of current detection in the $(N+2)^{th}$ period, is lost.

<Pulse Shift Process (Third Embodiment)>

Figure 6:
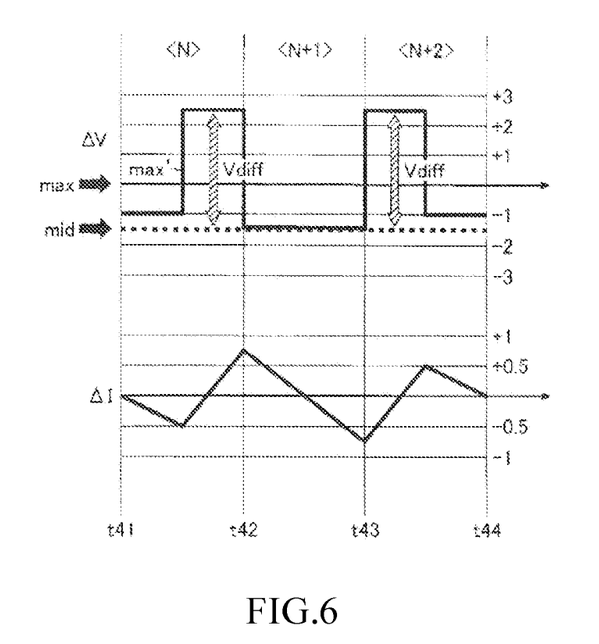
FIG. 6 is a diagram of a pulse shift process according to a third embodiment.

FIG. 6 shows a diagram of a pulse shift process of the PWM signal generator 17 according to the third embodiment. Similar to FIG. 4 and FIG. 5 above, in the upper part of the drawing, a correction amount $\Delta V$ of the maximum voltage command max based on a pulse shift process is depicted, and in the lower part of the drawing, a variance $\Delta I$ of the DC bus current iDC based on the pulse shift process is depicted.

Further, in the drawing, different from the second embodiment (FIG. 5) described above, an example of a situation wherein a difference (=max-mid) between the maximum voltage command max and the intermediate voltage command mid is "1.5" is described. Moreover, inversion of the maximum voltage command max generated based on correction and the intermediate voltage command mid is similarly not allowed in this embodiment. In other words, the correction amount $\Delta V$ of the maximum voltage command max is limited to be $\Delta V \geq -1.5$.

First of all, in the $N^{th}$ period (=at timings t41 to t42), left shift of the upper-side PWM signal hmax is performed. By illustrating in accordance with the drawing, a negative correction amount ($\Delta V=-1$) is assigned to the maximum voltage command max in the first half of the $N^{th}$ period, and a positive correction amount ($\Delta V=+2.5$) is assigned to the maximum voltage command max in the second half of the $N^{th}$ period.

That is to say, in the first half of the $N^{th}$ period, max'=max-1. At this point, the variance $\Delta I$ of the DC bus current iDC increases in the negative direction (0→-0.5) according to the correction amount ($\Delta V=-1$) of the maximum voltage command max. On the other hand, in the second half of the $N^{th}$ period, max'=max+2.5. At this point, the variance $\Delta I$ of the DC bus current iDC increases in the positive direction (-0.5→+0.75) according to the correction amount ($\Delta V=\pm2.5$) of the maximum voltage command max.

According to the correction, in the second half of the $N^{th}$ period, since the difference (=max'-mid) between the corrected maximum voltage command max' and the intermediate voltage command mid becomes greater than the predetermined value Vdiff (=4), the needed current detection period Tdet is ensured.

Next, in the $(N+1)^{th}$ period (=at timings t42 to t43), zero-difference shift is performed. By illustrating in accordance with the drawing, a negative correction amount ($\Delta V=-1.5$) is assigned to the maximum voltage command max throughout the $(N+1)^{th}$ period.

That is to say, in the $(N+1)^{th}$ period, max'=max-1.5 (=mid). At this point, the variance $\Delta I$ of the DC bus current iDC increases in the negative direction (+0.75→-0.75) according to the correction amount ($\Delta V=-1.5$) of the maximum voltage command max.

Next, in the $(N+2)^{th}$ period (=at timings t43 to t44), right shift of the upper-side PWM signal hmax is performed. By illustrating in accordance with the drawing, a positive correction amount ($\Delta V=+2.5$) is assigned to the maximum voltage command max in the first half of the $(N+2)^{th}$ period, and a negative correction amount ($\Delta V=-1$) is assigned to the maximum voltage command max in the second half of the $(N+2)^{th}$ period.

That is to say, in the first half of the $(N+2)^{th}$ period, max'=max+2.5. At this point, the variance $\Delta I$ of the DC bus current iDC increases in the positive direction (-0.75→+0.5) according to the correction amount ($\Delta V=\pm2.5$) of the maximum voltage command max. In contrast, in the second half of the $(N+2)^{th}$ period, max'=max-1. At this point, the variance $\Delta I$ of the DC bus current iDC increases in the negative direction (+0.5→0) according to the correction amount ($\Delta V=-1$) of the maximum voltage command max.

According to the correction, in the first half of the $(N+2)^{th}$ period, since the difference (=max'-mid) between the corrected maximum voltage command max' and the intermediate voltage command mid becomes greater than the predetermined value Vdiff (=4), the needed current detection period Tdet is ensured.

As such, given that the difference (=max-mid) between the maximum voltage command max and the intermediate voltage command mid is large to a certain extent, more specifically, if max-mid≥Vdiff/3 is satisfied, skipping the pulse shift process may be optional even in the configuration that does not allow inversion of the corrected maximum voltage command max' and the intermediate voltage command mid.

<Pulse Shift Process (Fourth Embodiment)>

Figure 7:
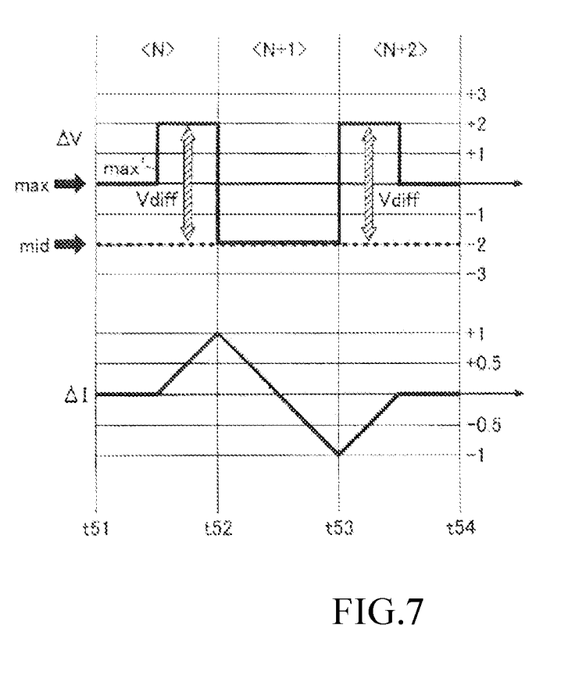
FIG. 7 is a diagram of a pulse shift process according to a fourth embodiment.

FIG. 7 shows a diagram of a pulse shift process of the PWM signal generator 17 according to the fourth embodiment. Similar to FIG. 4 to FIG. 6 above, in the upper part of the drawing, a correction amount $\Delta V$ of the maximum voltage command max based on a pulse shift process is depicted, and in the lower part of the drawing, a variance ΔI of the DC bus current iDC based on the pulse shift process is depicted.

Further, in the drawing, different from the second embodiment (FIG. 5) and the third embodiment (FIG. 6) described above, an example of a situation wherein a difference (=max-mid) between the maximum voltage command max and the intermediate voltage command mid is "2" is described. Moreover, inversion of the maximum voltage command max generated based on correction and the intermediate voltage command mid is similarly not allowed in this embodiment. In other words, the correction amount ΔV of the maximum voltage command max is limited to be ΔV≥-2.

First of all, in the $N^{th}$ period (=at timings t51 to t52), left shift of the upper-side PWM signal hmax is performed. By illustrating in accordance with the drawing, the maximum voltage command max is not corrected (ΔV=0) in the first half of the $N^{th}$ period, and a positive correction amount (ΔV=+2) is assigned to the maximum voltage command max in the second half of the $N^{th}$ period.

That is to say, in the first half of the $N^{th}$ period, max'=max. At this point, the variance ΔV of the DC bus current iDC becomes zero. In contrast, in the second half of the $N^{th}$ period, max'=max+2. At this point, the variance ΔI of the DC bus current iDC increases in the positive direction (0→+1) according to the correction amount (ΔV=+2) of the maximum voltage command max.

According to the correction, in the second half of the $N^{th}$ period, since the difference (=max'-mid) between the corrected maximum voltage command max' and the intermediate voltage command mid becomes greater than the predetermined value Vdiff (=4), the needed current detection period Tdet is ensured.

Next, in the $(N+1)^{th}$ period (=at timings t52 to t53), zero-difference shift is performed. By illustrating in accordance with the drawing, a negative correction amount (ΔV=-2) is assigned to the maximum voltage command max throughout the $(N+1)^{th}$ period.

That is to say, in the $(N+1)^{th}$ period, max'=max-2 (=mid). At this point, the variance ΔI of the DC bus current iDC increases in the negative direction (+1→-1) according to the correction amount (ΔV=-2) of the maximum voltage command max.

Next, in the $(N+2)^{th}$ period (=at timings t53 to t54), right shift of the upper-side PWM signal hmax is performed. By illustrating in accordance with the drawing, a positive correction amount (ΔV=+2) is assigned to the maximum voltage command max in the first half of the $(N+2)^{th}$ period. The maximum voltage command max is not corrected (ΔV=0) in the second half of the $(N+2)^{th}$ period.

That is to say, in the first half of the $(N+2)^{th}$ period, max'=max+2. At this point, the variance ΔI of the DC bus current iDC increases in the positive direction (-1→0) according to the correction amount (ΔV=+2) of the maximum voltage command max. In contrast, in the second half of the $(N+2)^{th}$ period, max'=max. At this point, the variance ΔV of the DC bus current iDC becomes zero.

According to the correction, in the first half of the $(N+2)^{th}$ period, since the difference (=max'-mid) between the corrected maximum voltage command max' and the intermediate voltage command mid becomes greater than the predetermined value Vdiff (=4), the needed current detection period Tdet is ensured.

As such, given that the difference (=max'-mid) between the corrected maximum voltage command max and the intermediate voltage command mid becomes larger, more specifically, given that max-mid≥Vdiff/2 is satisfied, the maximum voltage command max does not need to be corrected in the first half of the $N^{th}$ period and the second half of the $(N+2)^{th}$ period. In other words, the positive correction amount (ΔV=+2) in the $N^{th}$ period and the $(N+2)^{th}$ period can be canceled out by using only the negative correction amount (ΔV=-2) in the $(N+1)^{th}$ period.

<Pulse Shift Process (Fifth Embodiment)>

Figure 8:
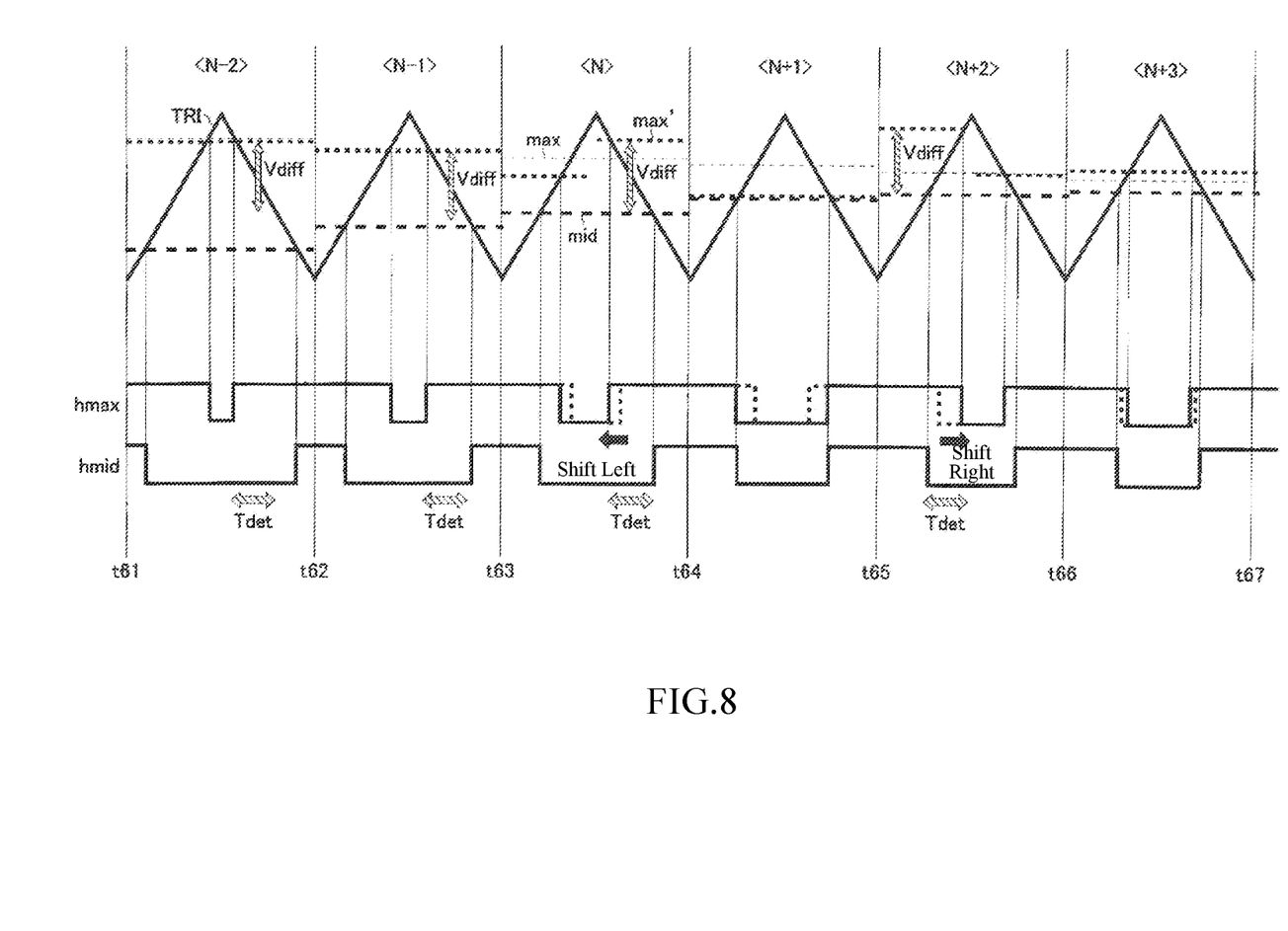
FIG. 8 is a diagram of a pulse shift process according to a fifth embodiment.

FIG. 8 shows a diagram of an example of a pulse shift process of the PWM signal generator 17 according to the fifth embodiment. From top to bottom, the maximum voltage command max and the intermediate voltage command mid (a dotted line and a dashed line), the triangular wave signal TRI (a solid line), and the upper-side PWM signals hmax and hmid, are depicted.

Further, with regard to the maximum voltage command max, the thin dotted line represents a non-corrected command value and the thick dotted line represents a corrected command value (to be referred to as a corrected voltage command max' below). Further, with regard to the upper-side PWM signal hmax, the dotted line represents a non-corrected (without pulse shift) behavior and the solid line represents a corrected (with pulse shift) behavior.

In the first to fourth embodiments (FIG. 4 to FIG. 7) described above, to keep the description brief, the difference (=max-mid) between the maximum voltage command max and the intermediate voltage command mid is set to be a fixed value; however, in this embodiment, behaviors with respect to the difference varying with time are described. Moreover, inversion of the maximum voltage command max generated based on correction and the intermediate voltage command mid is similarly not allowed in this embodiment.

In each period of the (N-2)th period (=at timings t61 to t62) and the $(N-1)^{th}$ period (=at timings t62 to t63), since the difference (=max-min) between the maximum voltage command max and the minimum voltage command min is greater than the predetermined value Vdiff, the needed current detection period Tdet is ensured. Thus, the PWM signal generator 17 determines that the pulse shift process does not need to be performed, and does not correct the maximum voltage command max.

In the $N^{th}$ period (=timings t63 to t64), the difference (=max-mid) between the maximum voltage command max and the intermediate voltage command mid is less than the predetermined value Vdiff, and so the needed current detection period Tdet cannot be ensured. Thus, the PWM signal generator 17 performs left shift of the upper-side PWM signal hmax by means of correcting the maximum voltage command max. By illustrating in accordance with the drawing, a negative correction amount is assigned to the maximum voltage command max in the first half of the $N^{th}$ period, and a positive correction amount is assigned to the maximum voltage command max in the second half of the $N^{th}$ period. Moreover, the total correction amount of the $N^{th}$ period is set to be zero (similar to FIG. 3 described above).

According to the correction, in the second half of the $N^{th}$ period, since the difference (=max'-mid) between the corrected maximum voltage command max' and the intermediate voltage command mid becomes greater than the predetermined value Vdiff, the needed current detection period Tdet is ensured.

In the $(N+1)^{th}$ period (=at timings t64 to t65), the difference (=max-mid) between the maximum voltage command max' and the intermediate voltage command mid is further decreased, and so it becomes even more difficult to ensure the needed current detection period Tdet. Thus, the PWM signal generator 17 discards the chance of current detection, and performs zero-difference shift. By illustrating in accordance with the drawing, a negative correction amount is assigned to the maximum voltage command max throughout the $(N+1)^{th}$ period, so that the corrected maximum voltage command max' synchronizes with the intermediate voltage command mid.

In the $(N+2)^{th}$ period (=at timings t65 to t66), right shift of the upper-side PWM signal hmax is performed, so as to cancel out the decrement in the maximum voltage command max in the $(N+1)^{th}$ period. By illustrating in accordance with the drawing, a positive correction amount is assigned to the maximum voltage command max in the first half of the $(N+2)^{th}$ period, so that the difference between the corrected maximum voltage command max' and the intermediate voltage command mid becomes greater than the predetermined value Vdiff. The maximum voltage command max is not corrected in the second half of the $(N+2)^{th}$ period.

According to the correction, in the first half of the $(N+2)^{th}$ period, since the difference (=max'−mid) between the corrected maximum voltage command max' and the intermediate voltage command mid becomes greater than the predetermined value Vdiff (=4), the needed current detection period Tdet is ensured.

Moreover, in a situation where using only the $(N+2)^{th}$ period cannot cancel the decrement of the maximum voltage command max in the $(N+1)^{th}$ period (for example, the corrected maximum voltage command max' has reached an upper limit), correction in the $(N+3)^{th}$ period (=at timings t66 to t67) can also be used in order for them to reach a balance.

Moreover, it can be predicted in advance that zero-difference shift is to be performed in the $(N+1)^{th}$ period to increase the left shift of the $N^{th}$ period (similar to FIG. 5 to FIG. 7 described above).

As such, in regard to whether to perform the pulse shift process in a certain PWM period and the correction amount of the maximum voltage command max of the pulse shift process, prediction can be made in advance according to the maximum voltage command max in the previous PWM period and the intermediate voltage command mid.

Other Variation Examples

Further, in addition to the embodiments, various modifications may be made to the technical features disclosed by the present disclosure without departing from the scope of the technical inventive subject thereof.

For example, description is given from the perspective of the maximum voltage command max and the intermediate voltage command mid; however, from the perspective of the intermediate voltage command mid and the minimum voltage command min (=the minimum voltage command of the existing voltage commands vU, vV and vW), the minimum voltage command min can be substituted for the maximum voltage command max for understanding.

As such, it should be understood that all aspects of the embodiment are exemplary rather than limiting, and it should also be understood that the technical scope of the present disclosure is not limited to the embodiment, but includes all modifications of equivalent meanings of the claims within the scope.

INDUSTRIAL APPLICABILITY

The motor control circuit disclosed by the present disclosure is suitable as control mechanisms used by AC motors in all kinds of applications.

What is claimed is:

1. A motor control circuit, comprising:
a voltage command generator, configured to detect a phase current from a direct-current bus current of an inverter driving an alternating-current motor, and generate three-phase voltage commands; and
a PWM signal generator, configured to generate three-phase pulse-width modulation (PWM) signals to the inverter according to a comparison result of the three-phase voltage commands and a triangular wave signal (TRI) with a predetermined frequency and outputting the three-phase PWM signals to the inverter, wherein
the PWM signal generator corrects a maximum or minimum voltage command by means of:
synchronizing the maximum or minimum voltage command with an intermediate voltage command in a first period of a plurality of consecutive PWM periods;
rendering a difference between the maximum or minimum voltage command and the intermediate voltage command to be greater than a predetermined value in a second period; and
setting a total correction amount of an entire interval of the plurality of PWM periods to be zero.

2. The motor control circuit according to claim 1, wherein the PWM signal generator corrects the maximum or minimum voltage command by means of shifting the PWM signal in a first direction in one of the second period consecutively before or after the first period, and shifting the PWM signal in a second direction opposite to the first direction in the other period.

3. The motor control circuit according to claim 1, wherein the PWM signal generator corrects the maximum or minimum voltage command by rendering the difference between the maximum or minimum voltage command and the intermediate voltage command to be greater than the predetermined value in one of a first half and a second half of the second period, and rendering a total correction amount of the second period to be substantially zero in the other half.

4. The motor control circuit according to claim 1, wherein the PWM signal generator allows inversion of the maximum or minimum voltage command and the intermediate voltage command based on correction.

5. The motor control circuit according to claim 1, wherein the PWM signal generator does not allow inversion of the maximum or minimum voltage command and the intermediate voltage command based on correction.

6. The motor control circuit according to claim 1, wherein the PWM signal generator does not correct the maximum or minimum voltage command when the difference between the maximum or minimum voltage command and the intermediate voltage command is equal to or greater than the predetermined value.

7. The motor control circuit according to claim 1, wherein the voltage command generator generates the three-phase voltage commands by means of vector control.

8. The motor control circuit according to claim 7, wherein the voltage command generator comprises:
an analog-to-digital converter (ADC), converting the DC bus current in an analog form into a first current value in a digital form from a current detection timing indicated by the PWM signal generator;
a Clarke converter, configured to convert the first current value of three phases into a two-phase second current value;
a Park converter, configured to convert the second current value in fixed coordinate system into a third current value in rotating coordinate system;

a proportional integral (PI) controller, configured to deriver a first voltage value for correcting the third current value to a target value;
an inverse Clarke converter, configured to convert the first voltage value in rotating coordinate system into a second voltage value in fixed coordinate system; and
an inverse Park converter, configured to convert the two-phase second current value into the three-phase voltage commands.

9. A motor device, comprising:
the motor control circuit according to claim 1;
an inverter, configured to be connected to the motor control circuit; and
an alternating-current (AC) motor, configured to be connected to the inverter.

10. The motor device according to claim 9, wherein the inverter comprises a single shunt resistor configured to detect the DC bus current.

11. A motor device, comprising:
the motor control circuit according to claim 2;
an inverter, configured to be connected to the motor control circuit; and
an alternating-current (AC) motor, configured to be connected to the inverter.

12. A motor device, comprising:
the motor control circuit according to claim 3
an inverter, configured to be connected to the motor control circuit; and
an alternating-current (AC) motor, configured to be connected to the inverter.

13. A motor device, comprising:
the motor control circuit according to claim 4
an inverter, configured to be connected to the motor control circuit; and
an alternating-current (AC) motor, configured to be connected to the inverter.

14. A motor device, comprising:
the motor control circuit according to claim 5;
an inverter, configured to be connected to the motor control circuit; and
an alternating-current (AC) motor, configured to be connected to the inverter.

15. A motor device, comprising:
the motor control circuit according to claim 6;
an inverter, configured to be connected to the motor control circuit; and
an alternating-current (AC) motor, configured to be connected to the inverter.

16. A motor device, comprising:
the motor control circuit according to claim 7;
an inverter, configured to be connected to the motor control circuit; and
an alternating-current (AC) motor, configured to be connected to the inverter.

17. A motor device, comprising:
the motor control circuit according to claim 8;
an inverter, configured to be connected to the motor control circuit; and
an alternating-current (AC) motor, configured to be connected to the inverter.

18. The motor device according to claim 11, wherein the inverter comprises a single shunt resistor configured to detect the DC bus current.

19. The motor device according to claim 12, wherein the inverter comprises a single shunt resistor configured to detect the DC bus current.

20. The motor device according to claim 13, wherein the inverter comprises a single shunt resistor configured to detect the DC bus current.

* * * * *